Feb. 1, 1944.  A. DION  2,340,457
STRAW BRUISER
Filed June 17, 1942
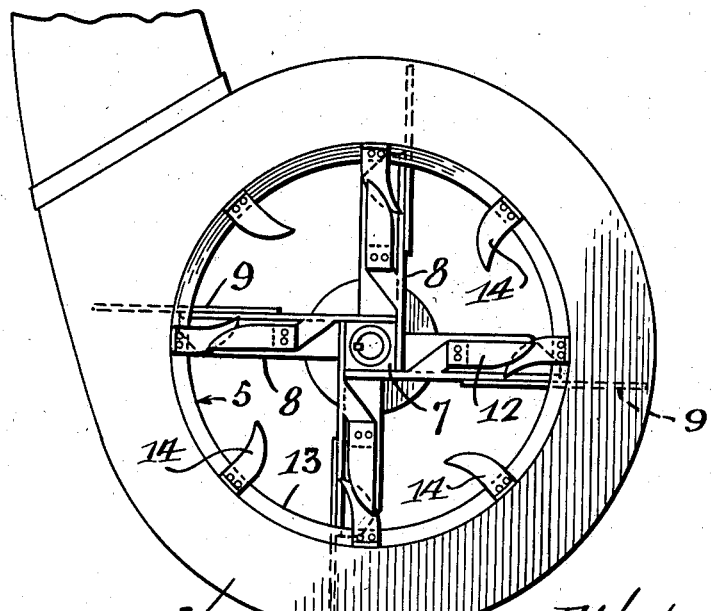
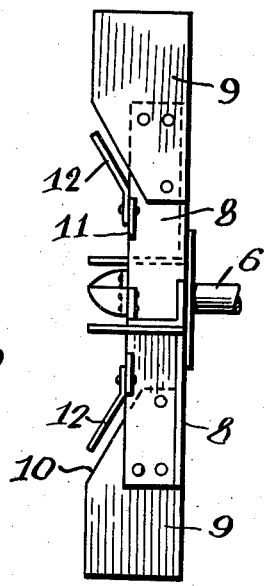
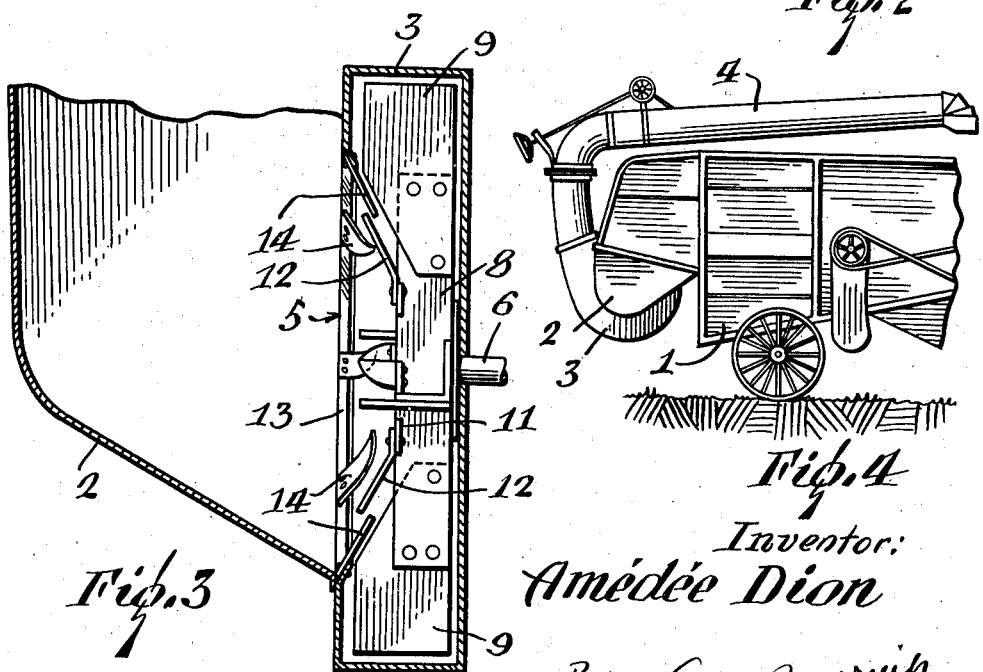
Inventor:
Amédée Dion Patented Feb. 1, 1944

2,340,457

UNITED STATES PATENT OFFICE 2,340,457

STRAW BRUISER

Amedee Dion, Ste.-Therese de Blainville, Quebec, Canada

Application June 17, 1942, Serial No. 447,447

2 Claims. (Cl. 146—107)

The present invention pertains to a novel straw bruiser or a device for cutting or bruising such material as straw while it is being discharged from a threshing machine by means of a blower.

The invention consists in fact in a modification of the blower structure applied to the threshing machine. The blower consists of a housing in which is mounted a bladed rotor for throwing the material through the discharge pipe. According to the invention, cutting blades are attached to the rotor in such a manner as to be spaced slightly from certain edges of the cutting blades.

A set of knives is suitably secured to the fixed rotor housing. Preferably, the lateral inlet of the housing is formed with an inwardly extending flange, and the knives are secured in spaced relation to the flange. The knives are so disposed that they are received in the space between the cutting blades and the rotor blade edges when the rotor is in motion. Consequently the knives attack the material effectively and cooperate with the cutting blades in the manner of shears. The material, after having been thus treated, is discharged from the housing by the action of the rotor.

The invention is fully disclosed by way of example in the following description and in the accompanying drawing in which:

Figure 1 is a side elevation of the device with the chute removed;

Figure 2 is an elevation of the rotor;

Figure 3 is a vertical diametrical section of the blower housing, showing the rotor in elevation, and Figure 4 is a side elevation of the apparatus applied to a threshing machine.

Reference to these views will now be made by use of like characters which are employed to designate corresponding parts throughout.

In Figure 4 the numeral 1 designates the rear end of a threshing machine which may be of usual construction. The machine is adapted to throw material such as straw into a chute 2 which communicates with a blower housing 3, which has an adjustable discharge pipe 4 for delivering the material to a desired location. As shown in Figures 1 and 3, one side of the housing 3 has open side 5 to provide communication with the chute 2.

In the center of the housing 3 is journalled a shaft 6 driven from the mechanism of the threshing machine in any suitable manner. Within the housing, the shaft carries a square hub or block 7 to the sides of which are fastened outwardly extending spokes 8, as shown more clearly in Figures 1 and 2. To the spokes in turn are attached paddles or blades 9 extending substantially to the periphery of the housing 3. Each blade 9 has an inclined edge 10 crossing its spoke 8, as may be seen in Figure 2, for a purpose that will presently be described.

Inward of each edge 10, the corresponding spoke 8 is formed with a laterally extending flange 11 to which is attached a cutting blade 12. The blades 12 extend parallel to the corresponding edges 10 and are slightly spaced therefrom as may be seen in Figures 2 and 3.

Around the opening 5, the housing 3 is formed with an inwardly extending angular flange 13 to which are attached a number of spaced knives 14. These are obviously stationary and are so disposed as to be received in the spaces between the rotary blades 12 and the corresponding edges 10 when the latter are in rotation, as may be seen in Figure 3.

In the operation of the device, the material such as straw that enters the housing 3 from the chute 2 is whirled by means of the rotating paddles 9. As the material strikes the fixed knives 14, the cutting blades 12 cooperate with the knives in the manner of shears. In this manner the material is cut or bruised and is eventually discharged through the pipe 4.

Although a specific embodiment of the invention has been illustrated and described, it will be understood that various alterations in the details of construction may be made without departing from the scope of the invention as indicated by the appended claims.

What I claim is:

1. A straw bruiser comprising a housing, means for feeding material thereto, a rotor in said housing, whirling paddles and cutting blades carried by said rotor, said blades being spaced respectively from said paddles axially with respect to said rotor, and a plurality of knives fixed to said housing and adapted to be received in said spaces on rotation of said rotor, whereby to cooperate with said cutting blades.

2. A straw bruiser comprising a housing having an inlet opening in a side wall thereof, a rotor in said housing, whirling paddles carried by said rotor and having each an annular edge, cutting blades carried by said rotor and extending parallel to said angular edges and forming spaces therewith, and a plurality of knives fixed to said housing and adapted to be received in said spaces on rotation of said rotor, whereby to cooperate with said cutting blades.

AMEDEE DION.